United States Patent [19]

Schaefer

[11] Patent Number: 4,556,702

[45] Date of Patent: Dec. 3, 1985

[54] OLIGOMERS AND HOMOPOLYMERS OF META- OR PARA-ISOPROPENYL-α,α-DIMETHYLBENZYLISOCYANATE

[75] Inventor: Frederic C. Schaefer, Darien, Conn.

[73] Assignee: American Cyanamid Company, Stamford, Conn.

[21] Appl. No.: 499,921

[22] Filed: Jun. 1, 1983

[51] Int. Cl.⁴ .............................................. C08F 12/26
[52] U.S. Cl. .................................... 526/310; 526/88; 260/453 AR; 260/453 AM
[58] Field of Search ................... 526/301, 310, 82, 83, 526/88; 260/453 AR

[56] References Cited

U.S. PATENT DOCUMENTS

| | | | |
|---|---|---|---|
| 2,507,105 | 5/1950 | Howard et al. | 526/82 |
| 2,606,892 | 8/1952 | Kropo | 526/310 |
| 3,290,350 | 12/1966 | Hoover | 526/312 |
| 4,276,394 | 1/1981 | Kennedy et al. | 526/206 |

*Primary Examiner*—Joseph L. Schofer
*Assistant Examiner*—Peter F. Kulkosky
*Attorney, Agent, or Firm*—Steven J. Hultquist; Gordon L. Hart

[57] ABSTRACT

Aromatic solvent-soluble linear oligomers or homopolymers of meta- or para-isopropenyl-α,α-dimethylbenzylisocyanate characterized by high isocyanate content are disclosed. Such oligomers or homopolymers are made by catalytic solution polymerization of the monomer in methylene chloride and/or toluene solution at a temperature of from about −80° C. to about −25° C., followed by low-temperature neutralization of the polymerization catalyst.

15 Claims, 1 Drawing Figure

FIG.1

OLIGOMERS AND HOMOPOLYMERS OF META- OR PARA-ISOPROPENYL-α,α-DIMETHYLBENZYLISOCYANATE

BACKGROUND OF THE INVENTION

1. Field of the Invention

This invention relates to oligomers and higher homopolymers of meta- or para-isopropenyl-α,α-dimethylbenzylisocyanate and to a method of making same.

2. Description of the Prior Art

In U.S. patent application Ser. No. 400,799, filed July 22, 1982, now U.S. Pat. No. 4,439,616, there is disclosed a method for production of tertiary aralkyl isocyanates, such as tetramethyl xylylene diisocyanates (TMXDI), by thermal cracking of corresponding urethanes formed by addition to corresponding olefins of carbamic acid esters at moderate temperatures and in the presence of acid catalyst. Such process is particularly useful in producing the meta- and para-isomers of TMXDI and as the by-product thereof, substantial amounts of the corresponding meta-isopropenyl-α,α-dimethylbenzylisocyanate (m-TMI) and para-isopropenyl-α,α-dimethylbenzylisocyanate (p-TMI), respectively, are formed.

The m-TMI or p-TMI by-product in such systems may be recycled within the process to improve the overall yield of TMXDI therein, but has substantial utility per se as a separate product due to its difunctional character, viz., the presence of reactive isocyanato (—NCO) and isopropenyl groups. Thus, TMI may be homo- or co-polymerized to form polymers with isocyanate functionality which are cross-linkable with curatives containing a difunctional or polyfunctional amino or hydroxyl compound. Such cross-linkable compositions have film-forming properties and advantageously may be used for coatings as for example on metal, wood and glass substrates, as well as having potential applicability for production of molded articles, such as by reaction injection molding (RIM).

U.S. Pat. No. 3,290,350 discloses the polymerization of TMI by conventional methods using known addition polymerization initiators, such as those of the free radical type such as peroxy and azo initiators. More specifically, this patent discloses homopolymerization of m-TMI in solvent mixture with isooctane containing boron trifluoride etherate at a polymerization temperature of −73° C. The resulting polymerized mixture then was allowed to equilibrate to room temperature and the polymer was isolated after three days. The isolated homopolymer had a softening temperature of about 60° C. and a molecular weight of about 1500, being soluble in dimethylformamide and insoluble in xylene.

It is an object of the present invention to provide aromatic solvent-soluble linear oligomers or homopolymers of m-TMI or p-TMI.

It is another object of the invention to provide oligomers or homopolymers of m-TMI or p-TMI which are substantially free of cross-linking.

It is a further object of the invention to provide homopolymers of the above type which have substantially higher molecular weights than are achievable by the method of the prior art, e.g., on the order of 4,000 to 12,000 and higher.

It is a still further object of the invention to provide a method for making such oligomers or homopolymers, which does not result in diminution of reactive —NCO content when the homopolymer or oligomer is equilibrated at ambient temperature from sub-ambient reaction temperatures.

Other objects and advantages of the invention will be apparent from the ensuing disclosure and appended claims.

SUMMARY OF THE INVENTION

The present invention in one aspect relates to a method of forming oligomers or higher homopolymers of meta- or para-isopropenyl-α,α-dimethylbenzylisocyanate comprising:

(a) solution polymerizing meta- or para-isopropenyl-α,α-dimethylbenzylisocyanate in a solvent selected from the group consisting of methylene chloride, toluene, and mixtures thereof at a temperature of from about −80° C. to about −25° C. in the presence of a catalytically effective amount of a Bronsted acid or Lewis acid polymerization catalyst, such as anhydrous p-toluenesulfonic acid or stannic chloride, and (b) neutralizing the polymerization catalyst at a temperature of from about −80° C. to about 10° C., thereby preventing substantial formation of isocyanic acid.

As used herein, neutralization of the polymerization catalyst, refers to the deactivation of the catalyst so that same no longer is active in promoting the polymerization of meta- or para-isopropenyl-α,α-dimethylbenzylisocyanate or in promoting elimination of isocyanic acid.

In another aspect, the invention relates to an aromatic solvent-soluble linear oligomer or homopolymer of meta- or para-isopropenyl-α,α-dimethylbenzylisocyanate of high isocyanate content.

As used herein, "aromatic solvent-soluble" means that the oligomer or homopolymer is soluble, inter alia, in toluene, xylene and benzene.

As also used herein, "high isocyanate content" in reference to the oligomers or higher homopolymers of the invention means that such oligomers or homopolymers contain greater than 3 milliequivalents (meg) isocyanates per gram of the oligomer or homopolymer.

In another aspect, the invention relates to a cross-linkable polymeric composition comprising a resin component containing a homopolymer of m-TMI or p-TMI as described above, and a cross-linkingly effective amount of a curing component containing a difunctional or polyfunctional amino or hydroxyl compound; such cross-linkable polymeric composition may be applied to a substrate as a film thereon and cured to form a coating having good solvent resistance and light stability characteristics.

DETAILED DESCRIPTION OF THE INVENTION

In accordance with the method of the present invention, oligomers or homopolymers of m-TMI or p-TMI are produced which are structurally linear, aromatic solvent-soluble, and substantially free of cross-linking. These unexpected characteristics of the oligomers or homopolymers of the present invention are achieved by forming the oligomer or homopolymer by low temperature solution polymerization in a solvent selected from the group consisting of methylene chloride, toluene, and mixtures thereof.

Temperature in the solution polymerization step suitably is from about −80° C. to about 10° C. and preferably is from about −80° C. to about 0° C., although the specific temperature to be employed will depend on the molecular weight of the product desired and the specific catayst employed. For example, oligomers suitably may be prepared by polymerization of m-TMI or p-TMI with a catalytic amount of anhydrous p-toluenesulfonic acid in methylene chloride solution at −25° C. to about 0° C. for several hours reaction time.

Low molecular weight homopolymers may be prepared by polymerization of TMI with a catalytic amount of stannic chloride at a temperature of less than −25° C. in methylene chloride in the presence of a tertiary benzylic chloride compound, the latter being employed as a chain transfer agent as described hereinafter in greater detail. In such low molecular weight product polymerization systems, reactions are complete in five-ten minutes at temperatures of from about −30° C. to about −78° C. Higher molecular weight homopolymer products may be obtained by polymerization of TMI under the same conditions, but without the presence of the chloride chain transfer agent in the monomer solution being polymerized.

As will be described in greater detail hereinafter, homopolymers of controlled molecular weight range may be prepared by a continuous process as described in connection with the reaction system shown in FIG. 1.

Following the solution polymerization as above described, the polymerization catalyst is neutralized at a temperature of from about −80° C. to about 10° C. and preferably from about −80° C. to about 0° C., thereby preventing substantial formation of isocyanic acid.

The termination of the polymerization step by neutralization of the catalyst with suppression of formation of isocyanic acid is a key aspect of the present invention. It has been determined that acid catalyzed elimination of isocyanic acid during warming of the polymeric or oligomeric product to ambient temperature, involving degeneration of the benzylic isocyanato moiety with elimination of isocyanic acid is an extremely detrimental side reaction which results in the production of undesirable unsaturation and consequent cross-linking in the oligomeric or polymeric product.

In the formation of oligomers by the method of the present invention, the polymerization catalyst suitably may be neutralized at temperatures of less than 5° C. and suitably at the temperature at which the polymerization reaction is carried out, by contacting the polymerization solution with neutral alumina, such as by flowing the polymerization solution through a packed column of neutral alumina. In such manner, an oligomeric product may be obtained which is primarily dimeric in character, with decreasing amounts of trimer, tetramer, etc.

In the formation of low molecular weight homopolymers of TMI by the above-described method of the present invention employing stannic chloride in methylene chloride solvent in the presence of a tertiary benzylic chloride compound, the catalyst suitably may be neutralized at a temperature of about −25° C. or less, by addition of pyridine to the polymerization reaction solution, so that the pyridine complexes with the stannic chloride. Under such reaction conditions, homopolymers are obtained which have peak molecular weights in the range of from about 4,000 to about 12,000 with substantial amounts of lower molecular weight material present.

In the aforementioned formation of high molecular weight homopolymers by treatment of TMI with stannic chloride at temperatures of about −25° C. or less, the catalyst neutralization may be carried out at the temperature of the polymerization reaction, i.e., at temperatures less than −25° C.

In the continuous polymerization system to be described in greater detail hereinafter, neutralization of the polymerization catalyst is carried out by continuously "quenching" the catalyst in a second reaction zone after polymerization is completed in a first reaction zone, such quenching being conducted at temperatures of about −25° C. or less. As used herein, "quenching" means reacting the polymerization catalyst with a neutralizing agent, e.g., a complexing agent which complexes with the catalyst to form an inert (non-catalytic) moiety.

As indicated, temperatures of 10° C. or higher are to be avoided in the solution polymerization and neutralization step of the method of the present invention, since such higher temperatures promote elimination of isocyanic acid from the monomer, and in consequence little or no polymerization results due to catalyst deactivation by the isocyanic acid.

Molecular weights on the order of 4,000–12,000 and higher are achievable using the method of the present invention, and molecular weights as high as 50,000–150,000 are possible depending on the reaction conditions and catalyst employed.

As a further unexpected aspect of the present invention, it has been found that molecular weights of the TMI homopolymer product can be controlled by conducting the polymerization step in the presence of tertiary benzylic chloride compounds which function as chain transfer agents to limit the molecular weight of the product polymer. In practice, it is possible to form homopolymers of relatively narrow molecular weight distribution having a peak molecular weight in the range of from about 4,000 to about 12,000, when the polymerization is conducted in the presence of a chain transferringly effective amount of a tertiary benzylic chloride compound, such as tetramethylxylylenedichloride or α-chlorocumene.

The TMI polymers (i.e., oligomers and homopolymers) of the present invention may be reacted with difunctional compounds such as diamines, glycols, and the like, to form cross-linked polymeric products suitable for coatings and for the preparation of molded objects.

As used subsequently herein, "the polymerizing step" will refer to solution polymerization of m-TMI or p-TMI at low temperature in the presence of a polymerization catalyst, and "the neutralizing step" will refer to neutralization of the polymerization catalyst at low temperature to prevent isocyanic acid elimination at higher temperatures.

In one preferred embodiment wherein the process of the present invention is employed to form oligomers, the catalyst employed in the polymerization step is anhydrous p-toluenesulfonic acid, the temperature in the polymerization step is from about −25° C. to about 0° C. and the temperature in the neutralizing step is from about −25° C. to about 5° C. Conveniently, the catalyst in such embodiment is neutralized by contact with neutral alumina.

In another preferred embodiment of the invention, suitable for forming homopolymers, the catalyst in the polymerizing step is stannic chloride, the temperature in the polymerizing step is from about −80° C. to about −20° C., and the temperature in the neutralizing step is from about −80° C. to about −20° C. In such embodiment, the catalyst is preferably neutralized by addition of a neutralizingly effective amount of pyridine to the polymerization solution from the polymerizing step, and the polymerizing step is carried out for a reaction time of from about 3 to about 30 minutes. Such embodiment is particularly advantageous for forming homopolymers of peak molecular weight in the range of from about 4,000 to about 12,000, wherein the polymerization step is conducted in the presence of a chain transferringly effective amount of a tertiary benzylic chloride compound, such as -α-chlorocumene or tetramethylxylylenedichloride, with the polymerization step being conducted for a reaction time of from about 3 to about 15 minutes.

Figure 1:
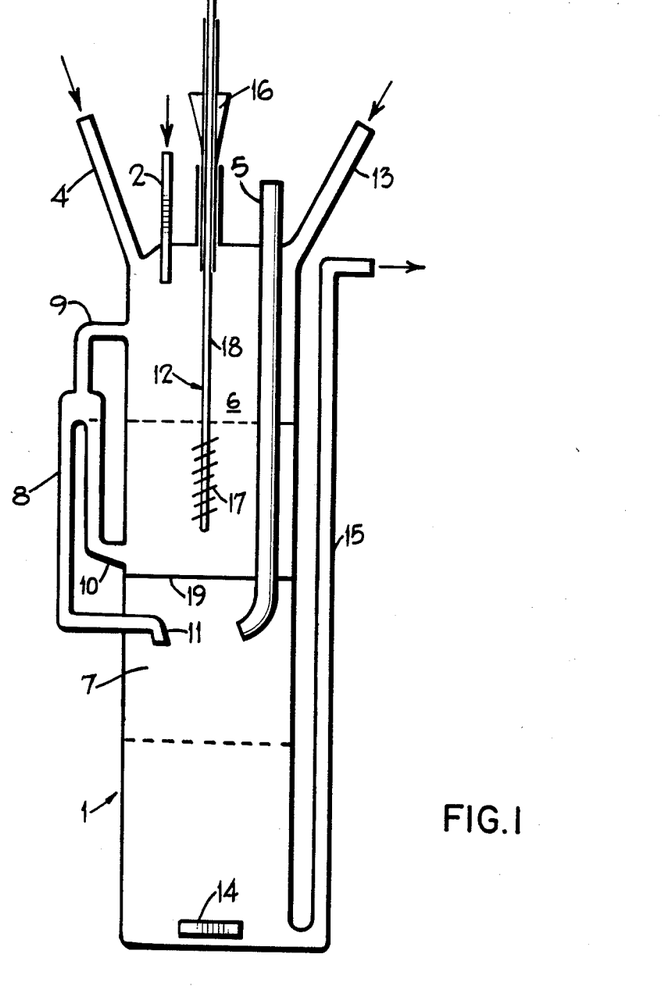
FIG. 1 is a cross-sectional elevational view of a reactor system for continuous polymerization of m-TMI or p-TMI in accordance with the method of the invention.

Referring now to the drawing, FIG. 1 shows a continuous polymerization reaction/neutralization system suitable for carrying out the method of the present invention to form aromatic solvent-soluble linear oligomers or homopolymers of TMI.

Referring to the drawing, the reaction chamber 1 is divided into two sequential reaction zones, a first reaction zone 6 separated from a second reaction zone 7 by separating wall 19. The reaction chamber I is provided with suitable insulation and heat exchange means to maintain temperature of the reaction volumes therein from about −80° C. to about −30° C.; such means have not been shown for ease of illustration, being of conventional type well-known to those skilled in the art. In like manner, valves and pumps employed in the system have not been shown for ease of illustration. The first reaction zone 6 has disposed therein an agitation means 12 comprising impeller or blading elements 17 positioned at the lower end of shaft 18, the impeller shaft being connected at its upper end with suitable drive means (not shown) in order to provide agitation and homogeneous mixing in said first reaction zone. The impeller shaft 18 is sealed at the top wall of the first reaction zone by shaft seal 16, so that the reaction volume in the first reaction zone may be maintained under a pressurized nitrogen atmosphere, by introduction of pressurized nitrogen gas in conduit 13, so that the reaction volume is not exposed to the atmosphere, thereby avoiding contamination of the reaction system with oxygen or atmospheric moisture.

The first reaction zone 6 is joined at its upper end to monomer feed conduit 2, in which TMI in solution with solvent such as methylene chloride and chain transfer agents, if any, e.g., α-chlorocumene is introduced into the first reaction zone to form a reaction solution therein with the polymerization catalyst, which is introduced in a separate stream of the reaction solvent in conduit 4.

The first reaction zone is coupled in fluid communication with the second reaction zone 7 by means of the manometric overflow transfer conduit 8, which has an overflow inlet 9 joined to the first reaction zone and a manometric leg forming a return conduit 10 to the first reaction zone to control liquid level in the first reaction zone. Polymerization solution from the first reaction zone entering the manometric overflow transfer conduit 8 is discharged at discharge end 11 into the second reaction zone.

The second reaction zone 7 is provided with a magnetic stirrer 14 coupled in indirect magnetic drive relationship with drive means (not shown). A quench feed line 5 is provided for introduction of the polymerization catalyst neutralization agent, e.g., pyridine in methylene chloride solution, to the second reaction zone. At the lower portion of the second reaction zone there is provided a product line 15 for withdrawal of product oligomer- and/or homopolymer-containing product solution from the second reaction zone.

In operation, the reaction system shown in FIG. 1 may be prepared for continuous operation by initially flushing the reaction chamber I with nitrogen to remove air and atmospheric moisture therefrom. The reaction chamber then may be chilled to the desired reaction temperature, e.g., −40° C. such as by circulation of a slurry of dry ice and acetone in contact with the outer walls of the reaction chamber through a heat transfer coil or jacket in contact therewith (not shown). TMI solution then is fed into the first reaction zone to partially fill same with the monomer solution but without effecting overflow transfer of the solution to the second reaction zone 7. As indicated, the TMI monomer solution comprises a solvent selected from the group consisting of methylene chloride, toluene and mixtures thereof, and optionally may contain a suitable chain transfer agent as described, in the event that limitation or restriction of molecular weight of the product oligomer or polymer is desired. After the introduced monomer solution in the first reaction zone has equilibrated to the desired reaction temperature level, a volume of the catalyst solution is introduced to the first reaction zone in feed line 4 to give the desired catalyst/TMI ratio. Feeding of the TMI monomer solution in line 2 then is resumed and thereafter the catalyst and monomer streams are continuously introduced to the first reaction zone to maintain the predetermined catalyst/TMI ratio.

Then, as overflow transfer of polymerization solution from the first reaction zone to the second reaction zone occurs, feeding of the quench stream (polymerization catalyst neutralization stream) to the second reaction zone 7 in quench feed line 5 is initiated and thereafter continued. When one reaction volume from the first reaction zone (measured by volume to the point of overflow) has been transferred from the first reaction zone to the second reaction zone, withdrawal of polymerized solution product in line 15 is begun, with the flow rate of withdrawal to match the input of TMI solution in line 2 and catalyst solution in line 4.

During polymerization and neutralization in the reaction chamber, a slight positive pressure of nitrogen above the reaction volumes in the first and second reaction zones and in all of the feed reservoirs is maintained. The product oligomer or homopolymer solution discharge from the second reaction zone 7 in product line 15 suitably may be discharged from product line 15 into any suitable receiving means such as a product reservoir closed to the atmosphere and joined to the same source of pressurized nitrogen gas as line 13, to maintain the product oligomer or polymer in the product reservoir under a nitrogen blanket.

As the product oligomer or polymer solution in the reservoir equilibrates from the low temperature of the first and second reaction zones (polymerization and neutralization steps), the neutralized catalyst complex deposits from the warmed solution as a white sludge. To facilitate such deposition, the product reservoir may be constructed as a clarification or gravity settling zone to facilitate drawoff of the separated solids. The effluent solution then may be processed for recovery of the oligomer or homopolymer product, such as by stripping the solvent and rediluting the residue with toluene followed by filtration to yield a final product polymer solution. The filtered oligomer or polymer solution then may be evaporated or employed as a oligomer or polymer solution product, depending on the further usage of same.

Illustrative applications of the various aspects of the invention are shown by the following non-limiting examples, wherein all parts and percentages are by weight, unless otherwise specified.

EXAMPLE I

A series of small scale tests with a wide variety of potential acid catalysts was carried out in the expectation that p-TMI could be converted to a dimeric product having an indane structure [(I) below]. Several such compounds are known to be formed readily by other α-methylstyrene derivatives. However, acid-catalyzed elimination of isocyanic acid (HNCO) from the tertiary isocyanate proved to be a facile side reaction which can only be avoided by keeping the reaction temperature low. Under such conditions a linear dimer/trimer mixture (II) can be obtained, with minor amounts of higher oligomers, by using a sulfonic acid catalyst in a polar aprotic solvent. The sulfonic acid effectively promotes chain transfer to monomer to limit the degree of polymerization; Lewis acid catalysts produce much higher molecular weight products. Surprisingly, no indane derivatives are formed under these conditions.

The weakly basic isocyanate group in p-TMI greatly reduces the effectiveness of the acid catalyst in such processes, as is demonstrated by a comparison of the rates of polymerization of p-diisopropenylbenzene (p-DIPEB) by dodecyklbenzenesulfonic acid in CH$_2$Cl$_2$ with and without p-TMXDI present. At 25° C. p-DIPEB gave a ringing gel in less than 30 seconds after addition of 4 mole percent catalyst. With an equivalent amount of p-TMXDI present to simulate o-TMI, after 10 minutes, 25% of the p-DIPEB remained. After 6 hours the diene was essentially zero, but the solution remained fluid.

EXAMPLE II

A solution of 209 g. of p-TMI (98.3%) having the following GLC analysis (approximately mole %):

p-TMI  98.3%

-continued

| | | |
|---|---|---|
| p-DIPEB | | 0.22 |
| p-TMXDI | | 0.34 |
| CH$_3$CO | ⌬⟨ | 0.66 |
| CH$_3$CO | ⌬—NCO | 0.34 | in 800 g. of fresh reagent grade CH$_2$Cl$_2$ (20–50 ppm H$_2$O) was prepared under nitrogen in a flask fitted with septum seals. After cooling to 2° in an ice bath, 40 cc. of 1.25M anhydrous p-toluenesulfonic acid (TSA) in toluene (5 mole %) was introduced gradually by syringe over a period of 15 minutes. The p-TSA monohydrate was dried by azeotropic distillation of a toluene solution using a Dean-Stark trap. The dry catalyst solution was stored under nitrogen in a septum-closed flask.

The temperature was held at 2°–4° during this time and thereafter as reaction proceeded. Progress of polymerization was measured by GLC analysis of samples at intervals using the small p-TMXDI impurity peak as an internal standard. After 5–7 hours, approximately 90% conversion of p-TMI was indicated. Dry AMBERLYST A-21 resin (85 g.) was then added to the cold suspension with minimum exposure to the atmosphere, and the suspension was stirred overnight with the temperature allowed to rise. AMERLYST-A-21 ion exchange resin (Rohm and Haas Co.) is a tertiary amine macroreticular resin designed for use in non-aqueous systems. The large water content of the resin as supplied (19%) was reduced by leaching with acetone, and the resin was then dried by azeotropic distillation with toluene, first using a Dean-Stark trap and finally recycling over 3 Å molecular sieves in a Sohxlet apparatus. The solvent was then evaporated, leaving the dry resin (0.17% H$_2$O) which was stored under nitrogen. If water is present during the resin treatment hydrolysis of isocyanate to urea leads to high molecular weight polymers and low RNCO content. The mixture was subsequently filtered, and the resin washed exhaustively with CH$_2$Cl$_2$. Evaporation of the filtrate left 213 g. of syrup. GLC analysis showed 27.4 g. of p-TMI (13% recovery) and 5.1 g. of p-TMXDI.

The crude product was stripped of volatile impurities by means of a 2"-Pope wiped-film still at 0.25 mm. pressure and maximum temperature 170°; flow rate 1.1 g./min. The undistilled material was a stiff, very slight hazy, light amber syrup at room temperature (162 g. recovered).

Analysis showed:
0.08% p-TMI
0.02% p-TMXDI
0.02% p-acetyl-α-methylstyrene
4.35 meg/g RNCO (theory: 5.0)
2.60 mmoles/g unsaturation (theory for dimer: 2.50)
256 ppm sulfur (as p-TSA)

Gel permeation chromatography indicated a mixture of dimer (59.7 percent), trimer (25.2 percent), tetramer, etc. (15.1 percent). The GPC results are based on detection by refractive index which may give greater response to the more unsaturated dimer.

The residual sulfur in the product corresponded to removal of 97.5 percent of the p-TSA catalyst by the ion-exchange resin. Further removal was attempted by passing a CH$_2$Cl$_2$ solution (15 percent concentration)

over a column of WOELM I neutral alumina. Recovered material then had 55 ppm sulfur. These procedures were used to prevent acid-catalyzed isocyanic acid elimination from the oligomers at room temperature without introducing a contaminant. A very convenient means of inactivating the catalyst is addition of excess pyridine at the oligomerization temperature, if the product is used in application where pyridine is tolerable.

Methylene chloride ($\epsilon$, 9.0) is a convenient solvent which is substantially dry as supplied. Somewhat faster oligomerization rates (and isocyanic acid elimination) were obtained if the water content is further reduced by drying the solvent with 3 Å molecular sieves. Much faster reactions were obtained with dry nitromethane ($\epsilon$, 36), however, it is to be noted that nitromethane is recognized as a hazardous material in the presence of strong acids and may not be an allowable solvent for large scale commercial applications of the invention. Any water present in these solvents was almost instantaneously consumed in acid-catalyzed hydrolysis of the isocyanate to amine salt, which also reduces the catalyst level. Sulfonic acids were not strong catalysts for polymerization of p-TMI in toluene solution.

Elimination of isocyanic acid at temperatures above 5° produced insoluble cyamelide and cyanuric acid which varied from a slight haze to a heavy precipitate. These by-products tended to neutralize the catalyst and terminate polymerization. The molecular weight of the product also increased as the elimination generated additional olefinic groups which led to chain extension. If the presence of insolubles is not objectionable, such reactions at higher temperature could be used to give oligomers in the 1000–3000 molecular weight range. Conducting the reaction at temperatures below 0° C. slowed the polymerization but did not enhance the dimer yield significantly. Slow addition of p-TMI to the catalyst in CH$_2$Cl$_2$ or use of more dilute solutions were also without significant effect on the molecular weight.

Small samples of the dimer and trimer of p-TMI were isolated after resolution on the GPC columns. NMR examination showed that the dimer was predominantly the isomer (II) and there was no structure that would indicate a monoisocyanate. The isolated trimer material was similar but clearly a mixture. The U.V. spectra of these samples were substantially identical ($\mu$max, 248,247 rm, respectively) with no hint of indane structure ($\mu$max, 268,277 for the $\alpha$, p-dimethylstyrene derivative). HPLC examination of the isolated dimer gave higher resolution and showed this material to be ~87% major component with 9% of a second compound, probably the internal olefin isomer. The trimer fraction showed two major compounds in addition to some dimer. (HPLC on SiO$_2$ with Heptane/CH$_2$Cl$_2$ elution, U.V. detector).

EXAMPLE III

U.S. Pat. No. 3,290,350 discloses polymerization of p-TMI in a hydrocarbon solvent (isooctane) with BF$_3$.Et$_2$O catalyst at −78° to room temperature (Example XVII in the patent). This example was repeated and examined in more detail with m-TMI. Boron fluoride etherate (0.14 cc) was added under nitrogen to a solution of 5.9 g of m-TMI in 25 cc of heptane at −78° C. After one hour the two-phase mixture was allowed to warm to room temperature and was stored for 5 days. Pyridine (1 cc) was then added to quench the the reaction, and the superior heptane phase was separated and analyzed by GLC. Approximately 65% of the starting m-TMI remained unchanged. The heptane-insoluble reaction product was dispersed in CH$_2$Cl$_2$, clarified by repeated filtration at 1.5% concentration, and analyzed by GPC. This showed a very broad molecular weight range, 400 to 50,000, peaking at 6000.

EXAMPLE IV

For the series of reactions summaried in Table II, a methylene chloride solution of SnCl$_4$ was cooled to the desired temperature under nitrogen in a serum-capped bottle equipped with a magnetic stirrer. m-TMI was then added at a constant rate by syringe pump, after which stirring was continued for an additional period ("Quench Time"). A typical GLC analysis of the m-TMI used was (approximately mole %):

TABLE II

| | POLYMERIZATION OF m-TMI BY SnCl$_4$ | | | | | | | | | | | |
|---|---|---|---|---|---|---|---|---|---|---|---|---|
| | | | | Molal Conc. | | | | | | | Mol. Wt. | |
| Reference | m-TMI (g) | SnCl$_4$ (g) | CH$_2$Cl$_2$ (cc) | m-TMI (final) | SnCl$_4$ | Catalyst Ratio | Reaction Temp. | Add'n. Rate | Quench Time | Residual m-TMI | Peak (GPC) | RNCO in Polymer |
| 151 | 8.7 | 0.24 | 45 | 0.96 | 0.021 | 2.2% | −78° C. | ~0.5 g/min | 30 min. | 1.1% | ~50,00; sh~20,000 | 4.5 meq/ |
| 153 | 7.0 | 0.28 | 33 | 1.06 | 0.033 | 3.1 | −62° C. | 0.28 | 30 | — | ~50,00; sh~20,000 | 4.2 |
| 171A | 9.4 | 0.42 | 81 | 0.51 | 0.018 | 3.5 | −78° C. | 0.21 | 5 | 0.7 | ~50,00; sh~20,000 | 4.5 |
| 171B | 4.6 | 0.43 | 69 | 0.31 | 0.022 | 7.1 | −78° C. | 0.10 | 5 | 0.4 | ~50,00; sh~20,000 | 4.4 |
| 171C | 4.5 | 0.10 | 90 | 0.24 | 0.0041 | 1.7 | −78° C. | 0.10 | 5 | 8 | ~50,00; sh~20,000 | ~4.6 |
| 172A | 4.6 | 0.10 | 78 | 0.28 | 0.0046 | 1.6 | −48° C. | 0.10 | 5 | 28 | 50,000; 20,000 | |
| 172B | 4.5 | 0.18 | 71 | 0.30 | 0.0091 | 3.0 | −25° C. | 0.10 | 5 | 50 | 50,000; 4,000 | |
| 172C | 4.6 | 0.12 | 69 | 0.31 | 0.0062 | 2.0 | −78° C. | 0.10 | 5 | 8 | 50,000 | |

Pyridine (1.0 cc) was then added at the reaction temperature to neutralize the catalyst, and the reaction mixture was allowed to warm to room temperature. Clear solutions were present until the temperature reached about 0°, after which finely divided solid began to separate. After storage at room temperature overnight the polymer solutions were filtered and evaporated, and the recovered polymer was analyzed.

The solid which separated in experiment #151 was found by the IR spectroscopy to be a tin/pyridine complex, probably Sn(pyr)₂(OCN)$_n$Cl$_{4-n}$, where a minor part of the chloride in the SnCl₄ catalyst has been displaced by OCN⁻ ion. It was uncontaminated by cyanuric acid or cyamelide, showing that no more than a slight degree of isocyanic acid elimination had occurred at −78° C.

The experiments in Table II permit several additional conclusions:

(1) The catalyst was destroyed gradually as reaction proceeds. This was a small effect at −78° C. but required that the catalyst ratio be > ~2% for high conversion of the m-TMI. At higher temperatures reaction was limited by catalyst loss.
(2) At −78° C. the molecular weight of the polymer was insensitive to the catalyst concentration.
(3) Lower molecular weight polymer was produced at higher temperatures.
(4) Reaction was complete in 5–15 minutes at −78° C. when the catalyst level was ~3%.

EXAMPLE V

Table III summarizes an experiment in which the polymer molecular weight was monitored as it might be affected by changing nominal concentrations of catalyst and monomer as m-TMI was added continuously to SnCl₄/CH₂Cl₂ at −78° C. Aliquots of the reaction mixture were removed at intervals, quenched by addition to excess pyridine/CH₂Cl₂, and subsequently examined by gel permeation chromatography. Assay of the final sample (151 min.) for residual m-TMI showed conversion to be 93% complete, demonstrating that polymerization was nearly immediate at catalyst levels of ~1.5% or higher and that there was little if any loss of catalytic activity at −78° C. The GPC analyses of the six product samples of experiments A–F were virtually indistinguishable: no polymer less than 20,000 molecular weight was apparent, and the peark molecular weight was 50,000. Thus, the molecular weight did not appear to be influenced significantly by the catalyst ratio, the total TMI concentration, or the presence of preformed polymer.

TABLE III

POLYMERIZATION OF m-TMI BY SnCl₄

| Reference | Elapsed Time | Nominal [SnCl₄] (molal) | m-TMI added (0.1 g/min) | Nominal [TMI] (molal) | Catalyst Ratio | Wt. | mmole SnCl₄ | mmoles m-TMI | Nominal Residual Reaction Mixture mmoles SnCl₄ | mmoles m-TMI |
|---|---|---|---|---|---|---|---|---|---|---|
|   | 0 | 0.0117 |   |   |   |   |   |   |   |   |
| A | 23 min. | 0.0114 | 2.3 g. | 0.121 | 9.4% | 5.93 g. | 0.068 | 0.718 | 1.01 | 10.7 |
| B | 45 min. | 0.0113 | 2.2 g. | 0.243 | 4.7% | 6.32 g. | 0.071 | 1.54 | 0.94 | 20.1 |
| C | 68 min. | 0.0111 | 2.3 g. | 0.371 | 3.0% | 5.20 g. | 0.058 | 1.93 | 0.88 | 29.6 |
| D | 93 min. | 0.0107 | 2.5 g. | 0.511 | 2.1% | 4.41 g. | 0.047 | 2.25 | 0.83 | 39.8 |
| E | 123 min. | 0.0103 | 3.0 g. | 0.676 | 1.5% | 2.30 g. | 0.024 | 1.56 | 0.81 | 53.1 |
| F | 151 min. | 0.0100 | 2.8 g. | 0.823 | 1.2% | — | — | — | 0.81 | 67.0 |

TABLE IV

SnCl₄-Catalyzed Polymerization of m-TMI

| Reference | Reaction Temp. | [m-TMI] (molal) | SnCl₄ Add'n. Time | Final Catalyst Ratio | Quench Time | Residual m-TMI | Polymer MW |
|---|---|---|---|---|---|---|---|
| 178-D | −25° | 0.385 | 50 min. @ 0.11 g of 6.56% soln./minute. | 4.1% | 5 min. | 51% | Peak ~40,000; prominent shoulder at 2000–10,000 |
| 178-E | −50° | 0.354 | 50 min. @ 0.11 g of 6.56% soln./minute. | 4.4 | 5 min. | 0.5 | Peak at ~50,000 minor shoulder from ~2500. |
| 178-F | −78° | 0.411 | 50 min. @ 0.11 g of 6.56% soln./minute. | 3.7 | 30 | ~0 | >50,000 |

EXAMPLE VI

Table IV shows the results of a series of experiments in which SnCl₄ catalyst (in CH₂Cl₂) was added continuously to m-TMI/CH₂Cl₂ solutions at several low temperatures. The results show the tendency toward lower molecular weight polymer at higher temperature and the rapid loss of catalyst activity at ~ −25° C. An aliquot taken from the reaction mixture #178-F at 20 minutes reaction time (catalyst ratio=1.6%) showed m-TMI was already 95.5% converted.

EXAMPLE VII

In runs otherwise identical to experiments #178-D and E described above in Example VI, catalyst quenching with pyridine was omitted to determine if the catalyst would be completely deactivated by eliminated isocyanic acid at −25° to −50° C. This did not occur, and in both cases the initially fluid reaction mixture gelled shortly after warming naturally to room temperature, the −50° C. product much more rapidly. This result was prevented by addition of excess pyridine at the reaction temperature. At the molecular weights produced in these polymerizations, only slight amounts of isocyanic acid elimination is needed to produce crosslinking. In another experiment with 2.7 mole percent, m-DIPEB added to m-TMI, polymerization at −78° C. resulted in immediate gelation.

EXAMPLE VIII

Stannic chloride is considered to be a highly desirable catalyst due to its high activity, convenience in handling, and ease of removal by neutralization with pyridine to form a readily separable pyridine complex. However, seven other catalysts were evaluated. Titanium tetrachloride was about equally efficient and appeared to cause less isocyanic acid elimination and high conversion at −25° C. However, although pyridine quenching is effective, no way was found to remove the catalyst residues from the polymer; slow haze separation (TiO$_2$?) from the polymer or its solutions continued indefinitely. Et$_2$AlCl is also an effective catalyst (at $-50°$ to $-78°$ C.) in CH$_2$Cl$_2$, but subsequent haze separation was much like that with TiCl$_4$. Boron trichloride gave $\sim$78% conversion of m-TMI in CH$_2$Cl$_2$ at $-30°$ C. in 15 minutes at a catalyst level of 4.3 mole %. These last two catalysts were of special interest in connection with the possibility of "INIFER"-technique polymerization, as described hereinafter.

EXAMPLE IX

The INITIATION-TRANSFER ("INIFER") technique developed in recent years by J. P. Kennedy et al provides a method of conducting cationic polymerization to give controlled low molecular weight polymers. As applied to the preparation of m-TMI polymers of controlled molecular weight range, from oligomers of 6-15 units to high polymers, a tertiary benzylic chloride is employed as the source of carbonium ions and concurrently as a chain transfer agent to transfer chloride to the growing polymeric carbonium ion, resulting in termination with simultaneous generation of a new initiator, as shown below:

A complication of the above technique with m-TMI is that the product chlorine-terminated polymer is a new inifer. Consequently, termination is reversible and a broad, statistical molecular weight distribution tends to result.

Ideally, the metal chloride catalyst, MCl$_n$, is one which is insensitive to adventitious traces of moisture (the ubiquitous co-catalyst in practically all conventional Lewis acid-catalyzed processes) and reactive only toward the inifer. Thus, the catalyst should not itself initiate m-TMI polymerization.

A series of experiments was conducted to determine the efficacy as inifers in TMI-polymerization of BCl$_3$, Et$_2$AlCl, $\alpha$-chlorocumene, 1-(1-chloro-1-methylethyl)-4-(1-isocyanato-1-methylethyl)benzene [denoted hereinafter as p-TMXIC], m-TMXIC, and meta- and para-bis(1-chloro-1-methylethyl)benzene [hereinafter denoted as m-TMXDC and p-TMXDC, respectively].

In runs comparable to those summarized in Table IV for SnCl$_4$ catalysis, Et$_2$AlCl (1.0M solution in hexane, 4–5 mole %) was added rapidly to CH$_2$Cl$_2$ solutions of m-TMI with and without M-TMXDC (8.4 mole %) present at $-55°$ C. and $-78°$ C. Conversion of m-TMI was substantially complete in all cases. The viscosity of the product obtained with m-TMXDC appeared to be no less than that without the modifier, however, and was very high.

BCl$_3$ catalysis was employed (1.0M solution in CH$_2$Cl$_2$ used, 4 mole %) with m-TMI with and without-chlorocumene as inifer at $-30°$ C. Conversion was 76–78% complete regardless of the inifer level (0, 5.5, 10.9 or 17.6 mole % based on m-TMI), and all products appeared substantially identical.

In contrast to the non-ideal behavior of Et$_2$AlCl and BCl$_3$, the use of SnCl$_4$ was found to give reproducible and reasonably controllable molecular weights. Table V summarizes experiments in which m-TMXDC was used in the inifer. In these tests the catalyst was added rapidly 70-90 sec.) by syringe to m-TMI/m-TMXDC/CH$_2$Cl$_2$ solutions under nitrogen at the reaction temperature. The reactions were quenched by injection of excess pyridine and the products were analyzed after subsequent filtration of the tin-pyridine complex and (partly) crystallized pyridine hydrochloride.

Use of m-TMXDC in this way markedly reduces the average molecular weight (cf. Table IV).

TABLE V
POLYMERIZATION OF m-TMI BY SnCl$_4$/m-TMXDC

| Reference | Temperature | m-TMI | [m-TMI]; (molal conc.) | m-TMXDC (mole %) | SnCl$_4$ (mole %) | Quench Time | Residual m-TMI | Residual m-TMXDC | Molecular wt. peak |
|---|---|---|---|---|---|---|---|---|---|
| 184A | $-78°$ | 7.41 g | 0.60 M | 6% | 1.6% | 30 min. | — | — | 14,000 |
| B | $-78°$ | 7.43 | 0.63 | 4.4 | 1.4 | 30 | — | — | 16,000 |
| C | $-78°$ | 6.68 | 0.54 | 13 | 1.7 | 30 | 0.47 | $+^{(a)}$ | 10,000 |
| 192A | $-50°$ | 5.68 | 0.37 | 1.5 | 1.9 | 30 | 0.3 | — | 13,000 |
| B | $-50°$ | 5.31 | 0.35 | 7.9 | 2.0 | 30 | 0.9 | — | 6,000$^{(b)}$ |
| C | $-50°$ | 5.70 | 0.40 | 9.5 | 1.9 | 30 | 1.8 | — | 6,000$^{(b)}$ |
| D | $-50°$ | 5.29 | 0.36 | 9.8 | 2.4 | 10 | 1.1 | — | 7,000$^{(b)}$ |
| 193A | $-30°$ | 6.48 | 0.47 | 0 | 2.0 | 10 | 13 | — | 12,000; 39,000 |
| B | $-30°$ | 6.28 | 0.47 | 3.9 | 1.9 | 10 | 9 | — | 5,000$^{(b)}$ |
| C | $-30°$ | 5.83 | 0.45 | 9.4 | 2.2 | 10 | 2.4 | — | 4,100$^{(b)}$ |

$^{(a)}$m-TMXDC is detected as m-DIPEB in GLC analysis
$^{(b)}$Substantial oligomer content present from trimer up The effect is significantly less than would be expected from the amount of chain transfer agent used but increased at higher temperatures, presumably as the contribution of inifer initiation increases. m-TMI conversions were higher with m-TMXDC present, indicating that the net polymerization rate increased with respect to isocyanic acid elimination and catalyst deactivation.

Approximately 30 g. of polymeric isocyanate was isolated from combined polymer solutions from several small scale runs in which m-TMXDC had been used. The CH$_2$Cl$_2$ solution was evaporated, and the residue was dissolved in toluene and heated at 90° for two hours to promote dehydrochlorination of residual tertiary benzylic chlorides by the excess pyridine still present. The toluene solution was then filtered from insoluble pyridine hydrochloride and re-evaporated, leaving a glassy foam. Analysis showed 3.74 meq. RNCO per gram and less than 0.05 mmole unsaturation/g. Surprisingly, residual chloride amounted to 0.14 meq/g. Since the TMXDC used in these preparations was approximately equivalent to 0.5 meq. of chloride per gram of total monomers, about 28% of the original chloride remained in the polymer in an extraordinarily stable condition. Furthermore, the lack of unsaturation in the product (shown by both bromination analysis and NMR) showed that very little of the other 72% of starting chloride had been eliminated from tertiary chlorides by the pyridine treatment. This chloride had probably been present in the reaction mixture as carbamyl chloride which was reconverted to isocyanate by the pyridine, being known that tertiary benzylic chloride will equilibrate with tertiary isocyanate, as follows:

Further reduction in molecular weight was achieved through use of monofunctional chlorides. Experiments with α-chlorocumene (c.c.) and m-TMXIC are summarized in Table VI below.

cc, the overflow volume of the reactor chamber (first reaction zone). Both chambers as well as the feed and receiver reservoir were connected by syringe lines to a common dry nitrogen manifold kept at slightly above atmospheric pressure (containing a Firestone valve). Syringe feed lines were polyethylene tubing; the major flow lines were glass and VITON tubing.

Pyridine was fed as a 1:1 solution in CH$_2$Cl$_2$ to avoid freezing in the input tube (quench feed line 5).

Procedure

The empty reactor (frist reaction zone 6) was initially flushed with nitrogen and chilled to the desired reaction temperature (e.g. ~ −40°) with dry ice/acetone. TMI solution was fed to approximately half fill the reactor chamber. The monomer feed was then terminated and after the desired internal temperature was established, catalyst solution was introduced for an equal time at the steady-state flow rate. TMI feed was then resumed, and the reactants fed concurrently. As overflow from the reactor began, pyridine feed to the quench chamber was started. When one reactor volume was collected in the quench chamber, the output pump was started and the flow adjusted to match the total input to the reaction system and maintain steady-state operation.

When the TMI feed from the supply reservoir was exhausted, the system was flushed with three reactor volumes of CH$_2$Cl$_2$ with catalyst and quencher flow continued. All feed pumps were then stopped and the quench chamber pumped out. The product solution became cloudy on standing at room temperature and deposited a white sludge. The total mixture was stripped of solvent and the residue rediluted with toluene. Heating at 90°–110° before filtration aided in chloride removal if α-chlorocumene had been used. The

TABLE VI

PREPARATION OF LOW MOLECULAR WEIGHT m-TMI POLYMERS

| Reference | Temperature | [m-TMI] (molal conc.) | C.C. (mole %) | m-TMXIC (mole %) | SnCl$_4$$^{(a)}$ (mole %) | Holding time (+) | Residual m-TMI | Residual chloride in polymer | Molecular wt. Peak |
|---|---|---|---|---|---|---|---|---|---|
| 10A | −30° | 0.72 M | 6% | — | 2.17 | 10 min. | 3.7% | 7.3% | 4500 |
| B | −78° | 0.54 | 12 | — | 2.7 | " | 0.5 | — | 4900 |
| C | −50° | 0.58 | 11 | — | 2.8 | " | 0.5 | — | 4000 |
| D | −30° | 0.62 | 12 | — | 2.7 | " | 0.9 | — | 3200 |
| E | −30° | 0.58 | 18 | — | 2.6 | " | 0.8 | 2%$^{(c)}$ | 1700–2500 |
| 18A | −50° | 0.72 | — | 3.6 | 1.7 | " | — | 30%$^{(d)}$ | 10,000 |
| B | −50° | 0.79 | — | 4.6 | 1.8 | " | — | 30%$^{(d)}$ | 10,000 |
| C | −50° | 0.69 | — | 1.1 | 1.9 | " | — | 30%$^{(d)}$ | 14,000 |

$^{(a)}$SnCl$_4$/CH$_2$Cl$_2$ 0.48M, added in 50 sec.
$^{(b)}$Total reaction time until quenched with excess pyridine.
$^{(c)}$Fraction of initial chloride retained after heating at 80° for 1 hour with residual pyridine in toluene and filtration of pyridine hydrochloride.
$^{(d)}$No heat treatment as in (c).

EXAMPLE X

Continuous polymerization of TMI was carried out using a continuous reaction chamber apparatus of the type shown in FIG. 1. In this experiment, reaction chamber 1 was immersed to well above the overflow liquid level in a stainless steel bath through which the magnetic stirrer in the quench chamber (second reaction zone) was operated. TMI feed solution was pumped from a graduated reservoir by means of a small FMI pump, with catalyst and pyridine quencher solutions fed by syringe pumps. Another FMI pump was used to remove product solution via conduit 15 to a graduated receiver at a rate adjusted to hold the quench chamber liquid level approximately constant at about 57 filtered polymer solution was then able to be evaporated or used as such.

Polymer Preparations

Illustrative examples are summarized in Table VII below. In general the effects established in small batch runs were qualitatively demonstrated again in continuous operation, but in the continuous polymerization runs the steady-state reactor concentrations were substantially those at the end of batch reactions and conversion was therefor relatively slow. Because of the constant reaction conditions, the continuous polymerization technique has the potential for producing a relatively narrow molecular weight range.

TABLE VII

Continuance m-TMI Polymerizations

| Reference | Feed Solutions (Molar conc. in $CH_2Cl_2$) | | | | Reaction temp. | Reaction time | Steady-state Reaction conc. (nominal) | | | Pyridine conc. in Quencher |
|---|---|---|---|---|---|---|---|---|---|---|
| | [m-TMI] | [C.C.] | [$SnCl_4$] | [pyridine] | | | TMI | C.C. | $SnCl_4$ | |
| | (flow rates) | | | | | | | | | |
| 34 | 0.60 M (5.5 cc/min) | — | 0.70 M (0.16 cc/min) | 6.33 M (0.11 cc/min) | 50 ± 1° | 8.75 min. | 0.59 M | — | 0.018 M (3 mole %) | 8.75 min. |
| 77 | 0.31 M (3.30 cc/min) | 0.037 M (0.055 cc/min) | 0.63 M (0.055 cc/min) | 6.33 M (0.055 cc/min) | 37 ± 2° | 16.7 | 0.51 | 0.037 | 0.011 (2.1 mole %) | 16.7 |
| 106 | 0.80 M (4.81 cc/min) | 0.128 M (0.077 cc/min) | 0.92 M (0.077 cc/min) | 6.33 M (0.30 cc/min) | 38 ± 2° | 11.2 | 0.79 | 0.126 | 0.0145 (1.8 mole %) | 11.2 |

| m-TMI Concentration | conversion rate | Polymer Analysis | | | |
|---|---|---|---|---|---|
| | | RNCO content | Chloride | Total N | Molecular wt. (peak) |
| 98% | 40 g m-TMI/hr | 4.4 meq/g | 0.017 meq/g | 4.8 seq/g | less than 50,000 (brittle glass) |
| 89.6 | 20 g/hr | 3.9 | 0.048 | — | 3100 (viscous syrup) |
| 94 | 26 g/hr | 3.6 | — | — | 2900 (viscous syrup) |

What is claimed is:

1. A method of forming oligomers or homopolymers of meta- or para-isopropenyl-α,α-dimethylbenzylisocyanate comprising:
   (a) solution polymerizing meta- or para-isopropenyl-α,α-dimethylbenzylisocyanate in a solvent selected from the group consisting of methylene chloride, toluene, and mixtures thereof, at a temperature of from about −80° C. to about −25° C. in the presence of a catalytically effective amount of a polymerization catalyst selected from the group consisting of: Bronsted acids and Lewis acids; and
   (b) neutralizing said polymerization catalyst at a temperature of from about −80° C. to about 10° C., thereby preventing substantial formation of isocyanic acid.

2. A method according to claim 1 wherein said solvent is methylene chloride.

3. A method according to claim 1 of forming oligomers wherein said polymerization catalyst is anhydrous p-toluenesulfonic acid, said temperature in step (a) is from about −25° C. to about 0° C. and said temperature in step (b) is from about −25° C. to about 5° C.

4. A method according to claim 3 wherein said catalyst is neutralized by contacting polymerization solution from step (a) with neutral alumina.

5. A method according to claim 4 wherein said contacting is conducted by flowing said polymerization solution through a column of neutral alumina.

6. A method according to claim 1 wherein said catalyst is neutralized by addition of a neutralizingly effective amount of pyridine to the polymerization solution from step (a).

7. A method according to claim 1 wherein: (i) said polymerization catalyst is stannic chloride; (ii) said temperature in step (a) is from about −80° C. to about −20° C.; (iii) said temperature in step (b) is from about −80° C. to −20° C.; (iv) said polymerization catalyst is neutralized by addition of a neutralizingly effective amount of pyridine to the polymerization solution from step (a); and (v) polymerization in step (a) is conducted for a reaction time of from about 3 to about 30 minutes.

8. A method according to claim 7 of forming homopolymers of peak molecular weight in the range of from about 2,000 to about 12,000, wherein polymerization in step (a) is conducted in the presence of a chain transferringly effective amount of a tertiary benzylic chloride compound.

9. A method according to claim 8 wherein said polymerization in step (a) is conducted for a reaction time of from about 3 to about 15 minutes.

10. A method according to claim 8 wherein said tertiary benzylic chloride compound is α-chlorocumene.

11. A method according to claim 8 wherein said tertiary benzylic chloride compound is tetramethylxylylenedichloride.

12. A process for forming homopolymers of meta- or para-isopropenyl-α,α-dimethylbenzylisocyanate, comprising:
   (a) passing a first stream comprising a methylene chloride solution of meta- or para-isopropenyl-α,α-dimethylbenzylisocyanateinto a first reaction zone;
   (b) concurrently with step (a), passing a second stream comprising a methylene chloride solution of a catalytically effective amount of stannic chloride into said first reaction zone to form therein with said first stream a reaction volume;
   (c) maintaining said reaction volume under mixing conditions in said first reaction zone at a temperature from about −80° C. to about −25° C. for a time sufficient to polymerize said meta- or para-isopropenyl-α,α-dimethylbenzylisocyanate therein to a predetermined extent;
   (d) passing a stream of the polymerized reaction volume from said first reaction zone to a second reaction zone;
   (e) concurrently with step (d) passing to said second reaction zone a third stream comprising a methylene chloride solution containing pyridine in sufficient concentration and at sufficient flow rate of said third stream to neutralize said stannic chloride by complexing of pyridine therewith;
   (f) discharging neutralized homopolymer-containing solution from said second reaction zone; and
   (g) recovering said homopolymer from said discharged homopolymer-containing solution.

13. A process according to claim 12 wherein said recovering step (g) comprises:
   (i) heating said discharged homopolymer-containing solution to a temperature of from about 80° C. to about 120° C.
   (ii) filtering said heated solution from step (i); and (iii) recovering said homopolymer from the filtered homopolymer solution.

14. A process according to claim 13 wherein said recovering step (iii) comprises evaporating said filtered homopolymer solution to recover said homopolymer as a residual solid.

15. A process according to claim 12 wherein said methylene chloride solution of meta- or para-isopropenyl-α,α-dimethylbenzylisocyanate contains a chain transferringly effective amount of α-chlorocumene.

* * * * *